Patented Oct. 31, 1950

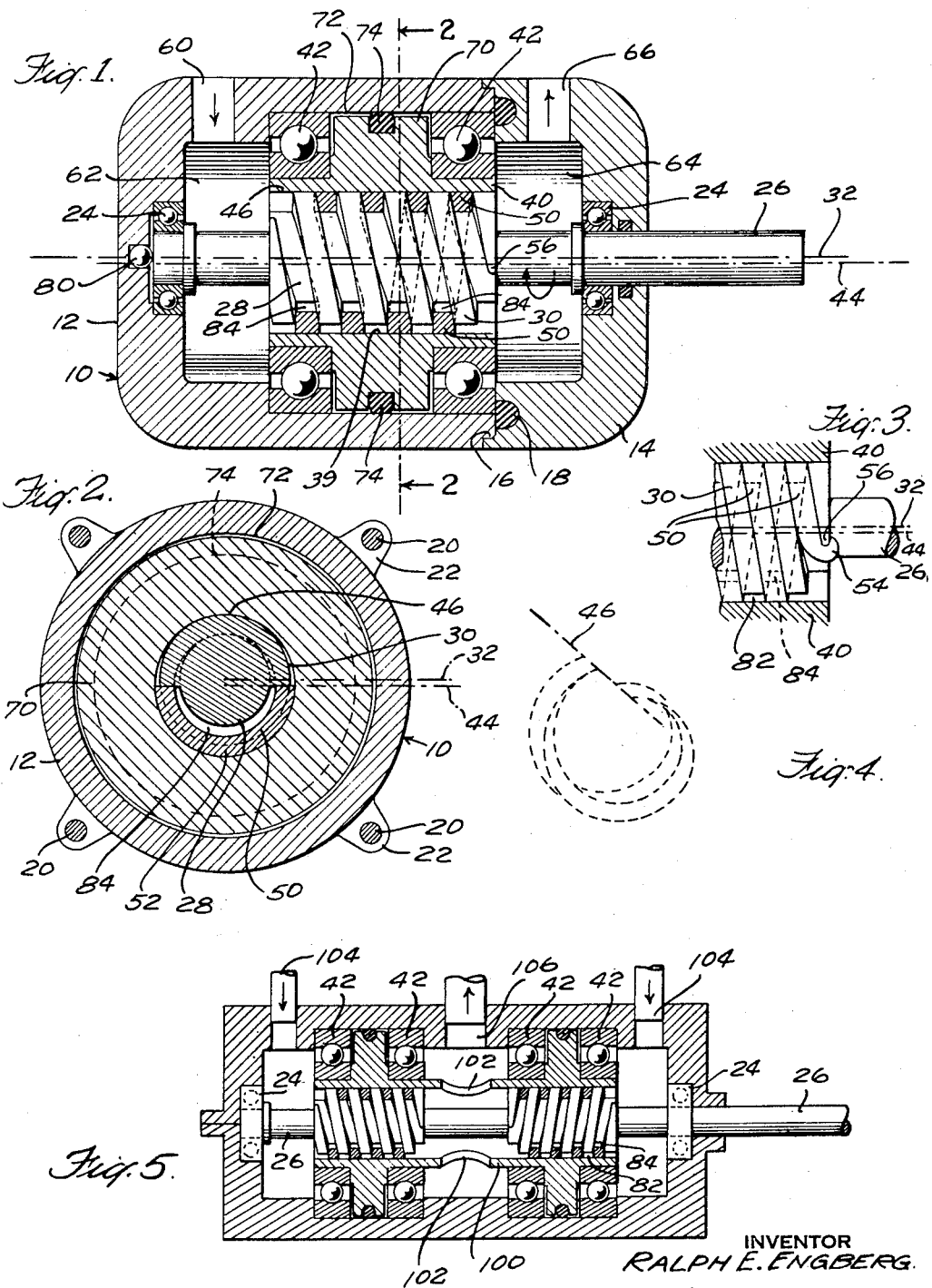

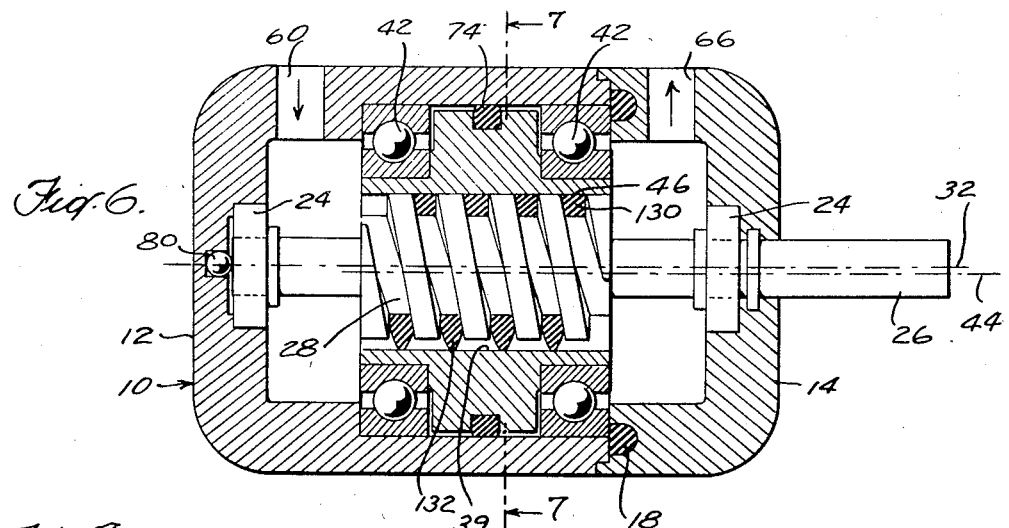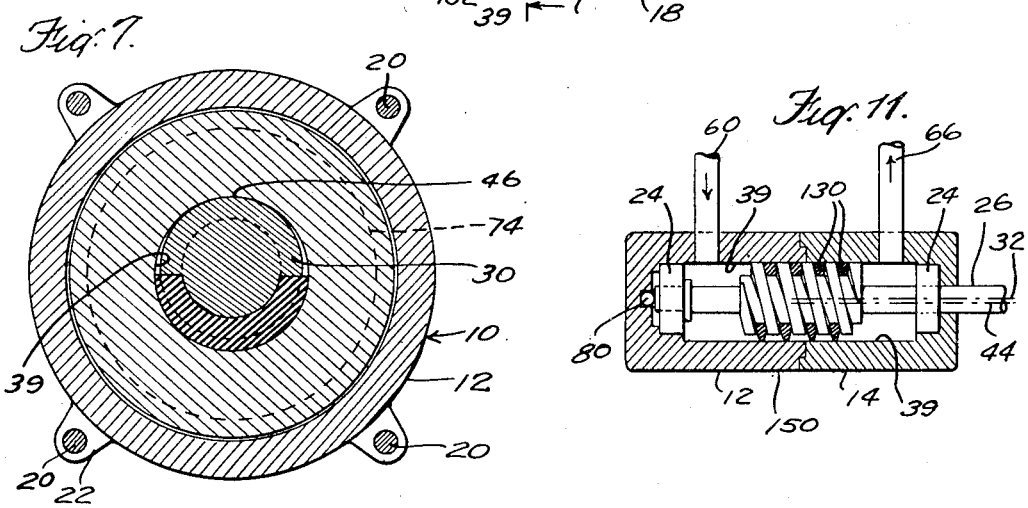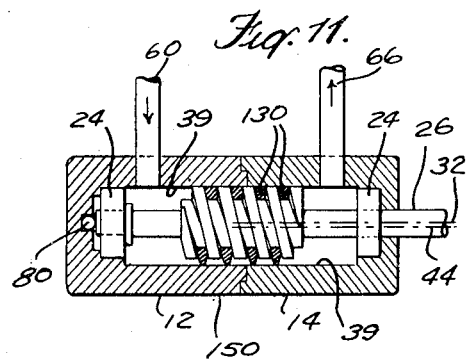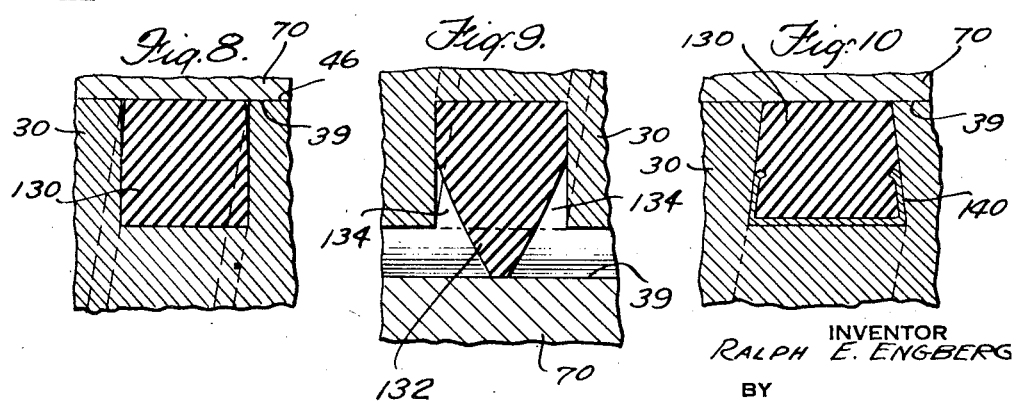

2,527,536

UNITED STATES PATENT OFFICE 2,527,536

ROTARY SCREW PUMP

Ralph E. Engberg, Brooklyn, N. Y.

Application May 15, 1945, Serial No. 593,875

8 Claims. (Cl. 103—117)

This invention relates to rotary pumps and particularly to rotary pumps in which the principal rotary element is in the form of a screw. The screw is arranged to rotate in a circular or cylindrical bore, the axis of rotation of the screw being eccentric to the axis of the bore. Mounted between the threads of the screw and rotatable therewith is a helical member, the outer diameter of which fits the inner diameter of the bore so that the helical member, while rotating with the screw, is at all times eccentric with respect to the screw. This construction results in the provision of one or more working chambers defined by the screw threads, the elements of the helix and the bore, these chambers being of a sort of crescent shape and travelling progressively along the screw as the screw rotates, thereby forcing the liquid contained therein from one end of the screw to the other. The bore may be formed directly in the pump casing, but is preferably formed in a shell or sleeve mounted to rotate in the casing about an axis eccentric to the axis of rotation of the screw. The use of a rotatable sleeve has the advantage of eliminating the friction and wear which would result from rotating the screw in a nonrotatable bore. As the screw revolves about a fixed axis of rotation and the helix and sleeve also revolve about a fixed axis of rotation, there is no revolution of any unbalanced weight and therefore no vibration set up no matter what the speed of operation of the pump.

The invention is particularly applicable to pumps for pumping liquids at high pressure, but in some forms it may be utilized in other ways.

Among the objects of the invention are to provide a pump which can be operated at high speed and which because of such operation may be made very small for its capacity, and is therefore especially applicable for use where small size and light weight are important, as for example upon airplanes.

It is also an object of the invention to provide a pump which can be operated at high speed without causing vibration, which will be durable, and which will be inexpensive to manufacture.

Other objects and advantages of the invention will appear from the following description of certain preferred forms of the invention.

In the accompanying drawings which show certain embodiments of the invention, shown for purpose of illustration, Figure 1 is a central longitudinal section of a form of pump embodying the invention;

Figure 2 is a transverse section on the line 2—2 of Figure 1;

Figure 3 is a view in side elevation of a portion of the screw and enclosing helical member, a part of the enclosing sleeve being shown in section;

Figure 4 is a diagram in perspective showing the shape of one element of the pumping chamber;

Figure 5 is a longitudinal central section of a modified form of pump.

Figure 6 is a longitudinal central section of another modified form of pump.

Figure 7 is a transverse section on line 7—7 of Figure 6.

Figure 8 is a longitudinal section on an enlarged scale showing an element of the elastic thread in compressed condition.

Figure 9 is a view similar to Fig. 8 taken in a position diametrically opposite to the position of Fig. 8 and showing the elastic element expanded across the working chamber;

Figure 10 is a view similar to Fig. 8 showing a modified way of securing the elastic element in the thread of the rotor; and Figure 11 is a longitudinal central section of another form of pump embodying the invention.

Referring to the drawings in detail, the pump comprises a casing 10, which is shown as formed of two cup-shaped members 12 and 14 which fit together along the line 16, the joint being sealed by a packing such as 18. The two members may be clamped together in any suitable manner, as by means of bolts 20 passing through lugs 22 on the members, shown in Fig. 2. Any other suitable construction of casing may be employed.

Mounted in bearings 24 in the casing is a shaft 26 upon which is fixed the screw 28 having a thread 30 shown in the present instance as a square thread. The screw 28 is concentric with the shaft 26, the axis of the shaft and screw being indicated by the broken line 32. The screw 28 rotates inside of a cylindrical bore 39, the inner diameter of which is slightly larger than the outside diameter of the screw, and the axis of which is eccentric with respect to the axis of the shaft and screw. In the form of the invention shown in Figs. 1 to 4 the bore 39 is formed in a sleeve 40 which is mounted to rotate in ball bearings 42 mounted in the casing, and the axis of the bearings 42 and accordingly of the sleeve and bore is displaced from the axis 32 of the shaft. The axis about which the sleeve rotates is indicated by the broken line 44. The displacement of the axis 44 from the axis 32 is equal to one-half of the difference in diameter between the bore of the sleeve and the outside diameter of the thread. This results in the thread contacting the sleeve along an element parallel with the axis, as indicated at 46 in Figs. 2 and 4. Diametrically opposite from this line of contact there is a space between the screw and the bore of the sleeve equal to the difference between the diameters of the screw and bore or to twice the displacement of the axes.

Mounted on the screw and fitting in the threads thereof is a helix 50. The cross section of each turn in the helix is of such shape and size as to fit closely between the threads of the screw, but the outside diameter of the helix is equal to he inside diameter of the bore 39 so that the helix only fits fully down into the screw at the point where the screw contacts the surface of the bore. This is at the position 46 in Fig. 2. At a point diametrically opposite 46, namely at the bottom position as indicated at 52 in Fig. 2, the helix is spaced from the bottom of the thread on the screw so that there are a series of more or less crescent shaped spaces formed upon this side of the screw. The approximate shape of these crescent shaped spaces is indicated by the diagram, Fig. 4. It is seen that each space starts from the line of contact between the screw and the sleeve and runs around gradually increasing in size as it reaches the bottom and diminishing to zero thickness again at the line of contact 46. The helix 50 rotates with the screw, it being held to the screw in any suitable manner as by means of having its ends 54 formed into hooks engaging the end convolutions of the screw, which are preferably rounded over as indicated at 56 in Fig. 3. The helix is thus prevented from screwing endwise on the screw, but rotates therewith at all times although free to have the necessary in and out movement laterally of the screw as required by the fact that its axis of rotation coincides with the axis 44 of the sleeve 40 and is therefore displaced from the axis of rotation 32 of the screw.

The space in the casing at one end of the screw is the inlet space and at the other end of the screw is the outlet space, depending upon the direction in which the screw is rotated. As indicated in Fig. 1, the liquid is drawn in through an opening 60 at the left hand end of the casing into the inlet space 62, and is forced out into the space 64 and through the outlet opening 66. Means are provided for preventing leakage from the inlet to the outlet side of the pump. In the construction shown this is accomplished by forming a flange 70 on the outside of the sleeve which extends outwardly between the bearings 42. It rotates inside of a surface 72 of the casing. Suitable packing means are preferably provided to make a seal between the periphery of the flange 70 and the surface 72. For instance a suitable packing ring 74 may be used for this purpose. As illustrated, a rubber O ring may be employed or any other appropriate type of packing may be used. As the sleeve 40 is free to rotate on its bearings 42, it will rotate with the screw 28 and helix 50 so that there will be no relative rotary movement between these parts, but all will turn together. This reduces friction and wear to a minimum, as the only rubbing will be due to the slight displacement of the helix with respect to the screw due to the eccentricity of its axis with respect to the axis of the screw. This movement will be very small and therefore there will be little wear and little friction and the pump will be very durable. This will be particularly true if the pump is used to pump oil or other liquid which will act as a lubricant.

It will be noted that the screw 28 rotates about its own concentric fixed axis 32 and the helix and sleeve rotate about the fixed axis 44 concentric therewith. There is no unbalanced weight rotating about an axis, therefore no vibrations will be set up so that the pump will operate smoothly at all speeds, even the highest.

Due to the form of the working chamber as indicated in the diagram Fig. 4, the liquid will be positively displaced as the pump revolves and will be gradually forced or "screwed" from one end to the other of the screw. If the parts are formed so as to give a reasonably good fit very high pressures may be produced, running up for example in a pump of the proportions shown to as much as several thousand pounds per square inch, if such pressure is required. If desired a thrust bearing 80 may be provided to take up the end thrust of the shaft 26 and screw. Theoretically the displacement of the pump does not depend upon the number of convolutions of the screw thread and helix, one complete convolution displacing the same amount of liquid as any number of turns. However a plurality of convolutions reduces leakage and therefore tends to increase the efficiency of the pump. The number of convolutions will be governed by the closeness of the fit of the parts and the pressure desired. Generally speaking, if high efficiency and high pressures are required more convolutions should be used than in the case of a low pressure pump.

There are actually two sets of working chambers of the general form shown in Fig. 4, one set being formed between the outer diameter of the threads 30 and the inner diameter of the sleeve 40 and being bounded on each side by successive convolutions of the helix, this set of working chambers being indicated at 82, Fig. 3. The other set of working chambers is similar in shape but of smaller diameter and is formed between the inside of the convolutions of the helix and the root of the thread of the screw, and is bounded on each side by the screw thread. Such working chambers are indicated at 84 in Fig. 3. The liquid in each of the working chambers is forced along as the screw rotates, traveling from one end of the screw to the other.

Figure 5 illustrates a modified construction in which a double screw arrangement is provided, one screw being right handed and the other being left handed. With this arrangement the thrust on the two screws balances so that no end thrust bearing is required. If desired the two sleeves in which the two screws operate may also be formed as a unit, being joined by the central sleeve portion 100. In this way the pressure on the two sleeves also is balanced. The sleeve portion 100 is provided with a series of large holes 102 for the passage of the liquid being pumped. In the construction shown in Fig. 5 the liquid is illustrated as being taken in at the two ends of the casing through the inlets 104 and passes to the discharge space between the two screws and through the outlet 106.

Figs. 6 to 9 show a modified form of pump in which the helical member mounted between the screw threads is formed of elastic material, such for instance as natural or synthetic rubber or other elastic plastic. In these figures all the parts shown are the same as in Fig. 1, except that in place of the helical spring 50, a helix of elastic material 130 is illustrated. This material is fixed between the threads of the screw in any suitable manner, for instance by being vulcanized therein. The normal cross section of the member 130 is tapered or pointed at the periphery, as indicated in Fig. 9 at 132. This is the shape of the elastic member where there is the maximum space between the screw threads and the bore 39. At the opposite diameter of the screw, where the screw contacts the bore, the elements of the elastic helix are compressed or flattened out as shown in Fig. 8 and at the top half of Fig. 6. In order to permit the elastic member to be forced in between the threads and flattened out in this manner, there is preferably a space left between the elastic member and the walls of the thread, as indicated at 134 in Fig. 9. The two spaces 134 at the two sides of the elastic member should have a combined area as great as the cross sectional area of the portion of the elastic member projecting beyond the diameter of the screw at the point of greatest projection. The principle of operation of this form of the invention is the same as that above described, except that instead of the helix having a sliding motion in the screw, it has a motion of compression and expansion. Chambers for the liquid to be pumped are formed between the outer periphery of the screw, the bore and the walls of the projecting portions of the elastic helix. Only one set of work chambers will be formed in this form of the pump, there being no space between the inside of the helix and the bottom of the screw thread for admission of the liquid.

Figure 10 shows an alternative mode of securing the elastic helix in position. As here illustrated, the helix is mounted in a channel shaped metal member 140 which fits in the thread of the screw. In this case the screw thread is shown as slightly undercut so as to better retain the elastic member. Any other suitable means of mounting the elastic member may be utilized.

Figure 11 shows a form of pump in which the bore 39 in which the rotor turns is a part of the casing 150 itself, and is not formed in a rotatable sleeve. The rotor may be in either of the forms previously described, it being shown as having a helix 130 of elastic material therein, as shown in Fig. 6. The action of the pump is the same as previously described, except for the possible increased friction and wear which may occur due to the rotation of the rotor in the stationary bore.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

What is claimed is:

1. In a rotary pump, a casing, a sleeve rotatably mounted in the casing, said casing having an inlet opening at one side of the sleeve and an outlet opening at the other side of the sleeve, means for preventing leakage of liquid from the inlet side of the casing to the outlet side of the casing externally of said sleeve said means comprising a flange on an intermediate part of the sleeve and a packing ring sealing the space between the periphery of the flange and inner surface of the casing, and a screw pumping element rotatably mounted in the bore of the sleeve, said screw pumping element comprising a screw of smaller diameter than the bore of the sleeve, and a helix fitting the threads of said screw and rotating therewith, the outer diameter of said helix closely fitting the bore of the sleeve, and bearings in the casing for rotatably mounting said screw, the axis of rotation of the screw being displaced from the axis of rotation of the sleeve by an amount equal to one-half the difference in diameter between the bore of the sleeve and the outer diameter of the screw.

2. In a rotary pump, a casing, a sleeve rotatably mounted in the casing, anti-frictional bearings mounted in the casing near the ends of the sleeve in which the sleeve rotates, said sleeve having an intermediate portion projecting between said bearings toward the inner surface of the casing, a packing ring carried by said projecting sleeve portion and sealing the space between the same and the inside of the casing, said casing having an inlet opening at one side of the sleeve and an outlet opening at the other side of the sleeve, and a screw pumping element rotatably mounted in the bore of the sleeve, said screw pumping element comprising a screw of smaller diameter than the bore of the sleeve, and a helix fitting the threads of said screw and rotating therewith, the outer diameter of said helix closely fitting the bore of the sleeve, and bearings in the casing for rotatably mounting said screw, the axis of rotation of the screw being displaced from the axis of rotation of the sleeve by an amount equal to one-half the difference in diameter between the bore of the sleeve and the outer diameter of the screw.

3. In a rotary pump, a casing, a sleeve rotatably mounted in the casing, said casing having an inlet opening at one side of the sleeve and an outlet opening at the other side of the sleeve, means for preventing leakage of liquid from the inlet side of the casing to the outlet side of the casing externally of said sleeve, and a screw pumping element rotatably mounted in the bore of the sleeve, said screw pumping element comprising a screw of smaller diameter than the bore of the sleeve, and a helix mounted between the threads of said screw comprising an elastic member of deformable material the convolutions of which contact the surface of the bore throughout the entire circumference of the helix, said convolutions being variably compressed at different points of the circumference of the screw and bore so as to conform to the variation in the width of the space between the screw and bore at different circumferential points.

4. A rotary pump comprising a casing, means therein formed with a cylindrical bore, said casing having an inlet opening at one side of the bore and an outlet opening at the other side thereof, a screw mounted to rotate in said bore about an axis parallel to, but eccentrically located with respect to the axis of the bore the axis of rotation of the screw being displaced from the central axis of the bore by an amount equal to one-half the difference in diameter between the bore and the outer diameter of the screw so as to produce a line of tangency between the outer diameter of the screw and bore, and a helix of elastic deformable material mounted between the threads of the screw, the convolutions of the helix contacting the screw surface at the bottom of the threads and the surface of the bore throughout the entire circumference of the helix, the convolutions of the helix being variably compressed at different points of the circumference of the bore so as to conform to the variations in the width of the space between the outer circumference of the screw and bore at different circumferential points, the helix being entirely compressed within the screw threads along the line of tangency between the outer surface of the screw and the surface of the bore.

5. A rotary pump as claimed in claim 4, in which the elastic deformable material before deformation is of generally wedge shaped cross section tapering to a narrow part projecting beyond the circumference of the screw, portions of the elastic material being spaced from the side walls of the threads of the screw so as to provide space into which the elastic material may expand when compressed.

6. A rotary pump as claimed in claim 4, in which the elastic deformable material has a flexible edge shaped to project beyond the circumference of the screw when uncompressed.

7. A rotary pump as claimed in claim 4 in which the elastic deformable helix is fixed to the screw as by vulcanization.

8. A rotary pump as claimed in claim 4 in which the means formed with a cylindrical bore comprises a sleeve rotatably mounted in the casing.

RALPH E. ENGBERG.

REFERENCES CITED

The following references are of record in the file of this patent:

UNITED STATES PATENTS

| Number | Name | Date |
|---|---|---|
| 1,572,738 | Maroger | Feb. 9, 1926 |
| 2,028,407 | Moineau | Jan. 21, 1936 |
| 2,293,268 | Quiroz | Aug. 18, 1942 |
| 2,397,139 | Heaton | Mar. 26, 1946 |
| 2,401,189 | Quiroz | May 28, 1946 |

FOREIGN PATENTS

| Number | Country | Date |
|---|---|---|
| 224,862 | Great Britain | Dec. 24, 1924 |
| 311,067 | Great Britain | May 9, 1929 |
| 427,475 | Great Britain | Apr. 15, 1935 |
| 699,642 | France | Dec. 16, 1930 |